US008515922B2

(12) United States Patent
Acuna et al.

(10) Patent No.: US 8,515,922 B2
(45) Date of Patent: Aug. 20, 2013

(54) DEDUPLICATED CACHING OF QUERIES FOR GREEN IT MANAGEMENT

(75) Inventors: Jorge D. Acuna, Vail, AZ (US); Pankaj S. Bavishi, Pune (IN); Ramani R. Routray, San Jose, CA (US); Dhaval K. Shah, Gujarat (IN)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 13/162,847

(22) Filed: Jun. 17, 2011

(65) Prior Publication Data

US 2012/0323861 A1 Dec. 20, 2012

(51) Int. Cl.
*G06F 17/30* (2006.01)

(52) U.S. Cl.
CPC .................. *G06F 17/30017* (2013.01)
USPC .......................................................... 707/692

(58) Field of Classification Search
USPC ................. 707/662–664, 692; 711/118, 122, 711/125, 126, 133
See application file for complete search history.

(56) References Cited

U.S. PATENT DOCUMENTS

| 7,499,910 | B2 | 3/2009 | Schneider et al. |
| 7,499,992 | B1 | 3/2009 | Hsieh et al. |
| 7,809,888 | B1 | 10/2010 | Clark et al. |
| 7,831,771 | B2 | 11/2010 | Degenaro et al. |
| 8,086,803 | B2 * | 12/2011 | Muthiah et al. ............... 711/133 |
| 2007/0006121 | A1 | 1/2007 | Jezierski et al. |
| 2009/0112829 | A1 | 4/2009 | Bremer, Jr. et al. |
| 2009/0224941 | A1 | 9/2009 | Kansal et al. |
| 2010/0250858 | A1 | 9/2010 | Cremelie et al. |
| 2010/0293335 | A1 | 11/2010 | Muthiah et al. |
| 2010/0312752 | A1 | 12/2010 | Zeis et al. |

FOREIGN PATENT DOCUMENTS

EP 0961210 A1 12/1999

OTHER PUBLICATIONS

Arvind Arasu et al., Large-Scale Deduplication with Constraints using Dedupalog, 2009, IEEE, 952-963.*
Guohua Wang et al., Research on a clustering data de-duplication mechanism based on Bloom Filte, 2010, EEE, 1-5.*
Christian Hoareau et al., "Hybrid Logics and Model Checking: a Receipe for Query Processing in Location-Aware Environments," IEEE, 1550-445X/08, 2008, pp. 130-137.
IBM, "Method and System for Providing a Parallel Discovery and Monitoring of Information Technology Resources," http://www.ip.com, IPCOM000187002D, Aug. 31, 2009, 6 pages.

* cited by examiner

*Primary Examiner* — Jean B Fleurantin
(74) *Attorney, Agent, or Firm* — Griffiths & Seaton PLLC (57) ABSTRACT

Exemplary methods, computer systems, and computer program products for smarter deduplicated caching of queries for green IT management in a computer storage device are provided. In one embodiment, the computer environment is configured for ascertaining the most-used data access chains. Multiple access paths to identical data are determined for the most-used data access chains. A generalized chain that is formed from the plurality of access paths to the identical data is determined. Multiple keys and information relating to the access paths to the identical data is deduplicated.

22 Claims, 9 Drawing Sheets

DEDUPLICATED CACHING OF QUERIES FOR GREEN IT MANAGEMENT

BACKGROUND OF THE INVENTION

1. Field of the Invention

The present invention relates generally to computers, and more particularly to deduplicated caching of queries for green IT management in a computer storage device.

2. Description of the Related Art

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data.

Computer system management requires information about computer components and network components, the state of each of those items, and their relationships. This information may include discovery of networks, network paths, computers, operating systems, file systems, network cards, installed applications, application components, user transactions, statistics of usage, and other information. There are many different approaches for discovering and retrieving portions of this information from a computer network and its components and for making this information available to clients. The Common Information Model (CIM) is an industry standard model defined by Distributed Management Task Force (DMTF), which enables administrators or software management programs to control applications and devices on heterogeneous platforms in an uniform and inter-operable way. Due to the generic architecture of CIM, it has been widely used in management software, which manages various kinds of storage and network devices. Information is made available through the CIM model by a CIM Object Manager (CIMOM). A CIMOM may maintain information within its repository, and a CIMOM may also be extended with additional information by adding provider plug-ins. CIM has become a common denominator for instrumentation and relationships within the software industry.

The CIMOM or CIM Agent has become almost the standard management interface of all modern day devices. Generally, CIM Agent(s) are queried by one or many management server(s) in a data center for centralized uniform management. For example, CIM Agent(s) of servers, network switches, storage subsystems, tape libraries etc. are queried by system management software such as Director to provide a end-to-end correlated view for seamless centralized management of the data center.

SUMMARY OF THE DESCRIBED EMBODIMENTS

In a managed environment, interactions between CIM Agent(s) and management server(s) follow a very standard set of query-response operations and may increases the traffic on the network along with load increases on the managed entity demands greater processing for response gathering and delivery. Therefore, a need exists for a mechanism to increase the efficiency query-response interaction that consumes less CPU cycles (hence energy costs) without placing limitations of the computer system.

Accordingly, and in view of the foregoing, various exemplary methods, computer systems, and computer program products for smarter deduplicated caching of queries for green IT management in a computer storage device are provided. In one embodiment, the computer environment is configured for ascertaining the most-used data access chains. Multiple access paths to identical data are determined for the most-used data access chains. A generalized chain that is formed from the plurality of access paths to the identical data is determined. Multiple keys and information relating to the access paths to the identical data is deduplicated.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Throughout the following description and claimed subject matter, the following terminology, pertaining to the illustrated embodiments, is described. The definitions may form a table of suitable of definitions, form matrices for suitable purposes, if needed, and for certain terms used herein.

The illustrated embodiments described, following, serve to address the issues described previously performing deduplication on data that has been cached. In one embodiment, a query-response interaction is used for deduplication on cached data. The most-used data access chains are ascertained. Multiple access paths to the data are determined for the most-used data access chains and a generalized chain is used.

In one embodiment, keys and information relating to the access paths to the data are deduplicated and the keys and the information are placed in cache. A caching mechanism is guided by a lightweight statistical hint infrastructure that automatically learns a recipe pattern. A traversal pattern is predicted and built by learning the behavior of a CIM client in a CIM agent.

In one embodiment, a management server and CIM client both may subscribe to a caching mechanism that is guided by a lightweight statistical hint infrastructure to make the query-response system more efficient. The mechanisms of the illustrated embodiments combine caching and deduplicating of queries and responses to reduce network load and processing power consumption. In one embodiment, the mechanisms of the illustrated embodiments populated the CIM agents manually with canned recipes as well as by automatically populating the CIM agents with canned recipes by learning the recipes and exploiting the self-reflective mechanism of the underlying CIM.

In one embodiment, the mechanisms perform deduplication on data that has been cached, wherein a query-response interaction is used for deduplication on cached data. The most-used data access chains are ascertained. Multiple access paths to the data are determined for the most-used data access chains and a generalized chain is used. A variety of keys and information relating to the access paths to the data are deduplicated and the keys and the information are placed in cache. A caching mechanism is guided by a lightweight statistical hint infrastructure that automatically learns a recipe pattern. A traversal pattern is built by learning the behavior of a CIM client in a CIM agent. The traversal pattern is predicted.

Figure 1:
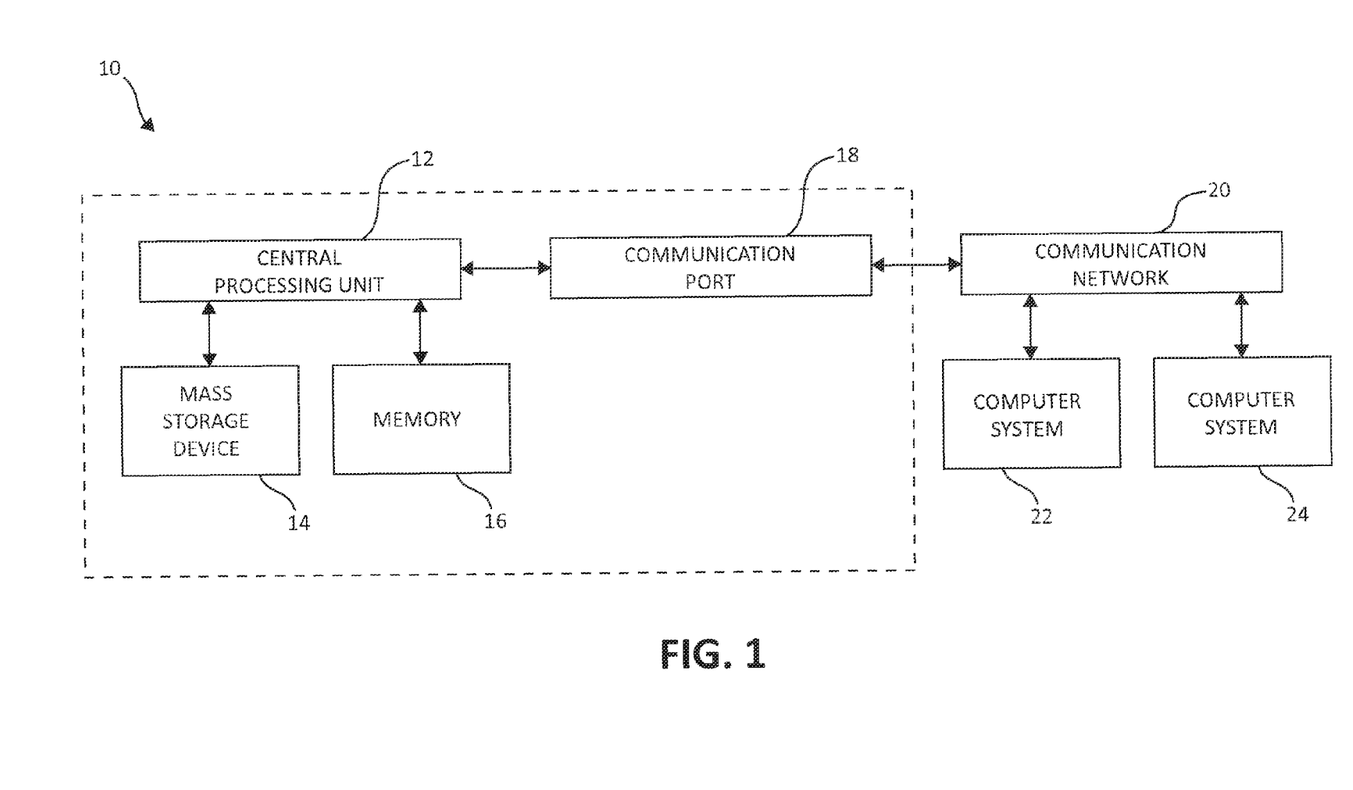
FIG. 1 illustrates a computer system environment having an example storage device in which aspects of the present invention may be realized.

Turning to FIG. 1, an example computer system 10 is depicted which may implement various aspects of the present invention. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2A:
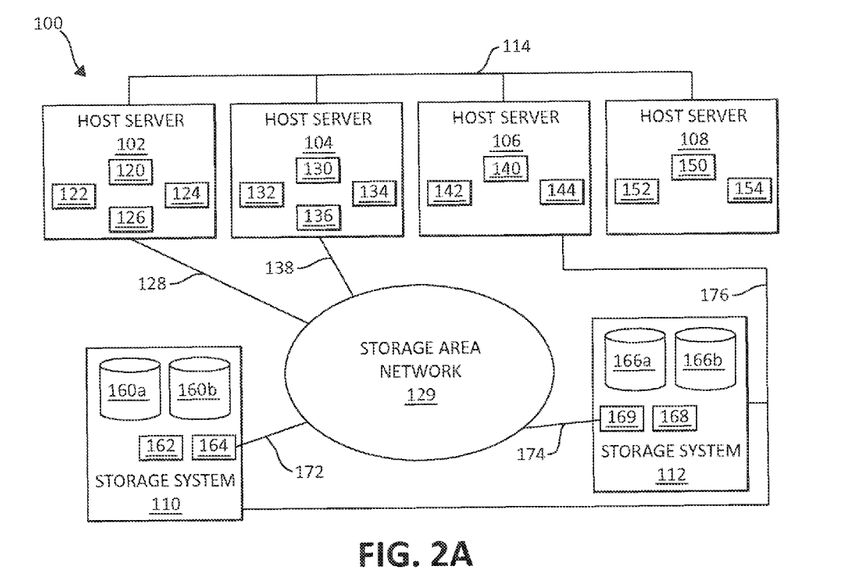
FIG. 2A illustrates an exemplary block diagram of the hardware components and interconnections of a computing system in which aspects of the present invention may be realized.

FIG. 2A illustrates an exemplary block diagram of the hardware components and interconnections of a computing system in accordance with an example of the invention. The computing system may be embodied, for example, by all or portions of the computing system 100 shown in FIG. 2A. In one embodiment, by way of example only, the computing system 100 includes a first host server 102, a second host server 104, a first CIM server 106, a second CIM server 108, a first storage system 110, and a second storage system 112. (The host servers 102, 104 may be called hosts 102 and 104.) Alternatively, in this embodiment and in the other embodiments discussed below, only one host could be included, or additional hosts could be included, and/or client computers could be included. Also, in this embodiment and in the other embodiments discussed below, only one CIM server could be included, or additional CIM servers could be included, or one or more CIM servers could be embedded in other devices. Also, in this embodiment or in the other embodiments discussed below, one or more ITSRM servers (not shown) could be included. The CIM servers 106, 108 may each be called a CIM Object Manager (CIMOM) or CIM agent(s). Each host 102, 104, and the CIM servers 106, 108 may run the same or different operating systems, which could be any suitable operating system(s), for example, Windows 2000, AIX, Solaris™, Linux, UNIX, or HP-UX™. Each host 102, 104, and the CIM servers 106, 108 may be implemented with any suitable computing device, and may be implemented with the same, or different computing devices. As an example, hosts 102, 104 and CIM servers 106, 108 each could be a personal computer (having for example, an Intel processor running the Windows or Linux operating system), a computer workstation, a mainframe computer, a supercomputer (for example an IBM® SP2 running the AIX operating system), or any other suitable computing device running any suitable operating system. In other examples, the hosts 102, 104, and the CIM servers 106, 108 each could be an IBM® xSeries server, or an IBM® zSeries Parallel Sysplex server, such as a zSeries 900, running the z Operating System (z/OS), Windows 2000, Linux, or AIX, or could be an IBM® S/390 server running OS/390. Hosts 102, 104 and CIM servers 106, 108 could also run Tivoli Storage Manager (TSM), which is available from IBM® Corporation. The hosts 102, 104, and the CIM servers 106, 108 may be coupled to each other with a network 114, which may be an IP network, and which may use any suitable type of communications channel technology, for example, Ethernet, ESCON (Enterprise Systems CONnnector), or FICON (Fiber CONnector). Additionally, network 114 could use the Internet, and could utilize wireless technology.

The host 102 has a processor 120 (which may be called a processing device), and in some examples could have more than one processor. As an example, the processor 120, may be a PowerPC RISC processor or an IBM® P690 power 4 processor, available from International Business Machines Corporation. In another example, the processor 120 could be a processor manufactured by Intel Corporation. The host 102 also may have a memory subsystem that may include a primary memory 122 (for example RAM), and/or a non-volatile memory 124, both of which are coupled to the processor 120. The memory subsystem may be used to store data and application programs and/or other programming instructions executed by the processor 120. The application programs could include a CIM Client Application and could generally be any suitable applications. The CIM Client Application may have knowledge of, and may establish connections with, one or more of the CIM servers 106, 108.

The non-volatile memory 124 could be, for example, a hard disk drive, a drive for reading and writing from optical or magneto-optical media, a tape drive, non-volatile RAM (NVRAM), or any other suitable type of storage. In some examples the primary memory 122 or the non-volatile memory 124 could be eliminated, or the primary memory 122 and/or the non-volatile memory 124 could be provided on the processor 120, or alternatively, external from the host 102. The host 102 also has a hardware bus adapter (HBA) 126, coupled to the processor 120, for coupling the host 102 via connector 128 to a Fibre Channel network (which may be called a "fabric) that may be used to implement a SAN 129. As an example, connector 128 may support FICON (FIber CONnector), ESCON (Enterprise Systems CONnector) communications channels. As an example, the hardware bus adapter 128 could be a model 2200 hardware bus adapter available from QLogic Corporation. Generally, the SAN 129 may be implemented using Fibre Channel network(s) and/or Ethernet network(s). As will be discussed below, in other embodiments a SAN need not be included. Using the SAN 129 permits coupling a large number of storage devices to the hosts 102, 104.

Similar to host 102, host 104 has a processor 130, a memory subsystem that that may include a primary memory 132 (for example RAM), and/or a non-volatile memory 134, both of which are coupled to the processor 130. The memory subsystem may be used to store data and application programs and/or other programming instructions executed by the processor 130. The application programs could include a CIM Client Application and could generally be any suitable applications. The host 104 also has a hardware bus adapter 136, coupled to the processor 130, for coupling the host 104, via connector 138 (which may be similar to connector 128), to the Fibre Channel network that may be used to implement the SAN 129. In an alternative embodiment, SCSI protocol, rather than Fibre Channel protocol, could be used to couple the hosts 102, 104 to the SAN 129.

Similar to hosts 102, 104, CIM Server 106 has a processor 140, a memory subsystem that may include a primary memory 142 (for example RAM), and/or a non-volatile memory 144, both of which are coupled to the processor 140. The memory subsystem may be used to store data and application programs and/or other programming instructions executed by the processor 140. The application programs could generally be a CIM Object Manager program, and any other suitable applications. In some embodiments the CIM server 106 could be coupled to the SAN 129, and consequently, CIM server 106 could also have a hardware bus adapter for coupling the CIM server 106 to the Fibre Channel network that may be used to implement the SAN 129.

Similar to the first CIM server 106, the second CIM server 108 has a processor 150, a memory subsystem that may include a primary memory 152 (for example RAM), and/or a non-volatile memory 154, both of which are coupled to the processor 150. The memory subsystem may be used to store data and application programs and/or other programming instructions executed by the processor 150. The application programs could generally be a CIM Object Manager program, and any other suitable applications. In some embodiments the CIM server 108 could be coupled to the SAN 129, and consequently, CIM server 108 could also have a hardware bus adapter for coupling the CIM server 108 to the Fibre Channel network that may be used to implement the SAN 129.

Storage system 110 includes storage devices 160a, 160b storage controller 162, and hardware bus adapter 164. Similarly, storage system 112 includes storage devices 166, 166b, controller 168, and hardware bus adapter 169. The storage systems 110, 112 could include additional storage devices. Storage system 110 is coupled to the SAN 129 via connector 172, and storage system 112 is coupled to the SAN 129 via connector 174. Connectors 172 and 174 may be similar to connectors 128 and 138 discussed above. There may be multiple paths to the storage systems 110, 112 in the SAN 129. Generally, a large number of storage systems may be coupled to the SAN 129. Also, storage devices that are not in storage systems could be coupled directly to the SAN 129, or could be coupled to the SAN 129 through a switch (not shown). The CIM servers 106, 108 are coupled to the storage systems 110, 112 via a network 17, which may be an IP network, and which may use any suitable type of communications technology such as discussed above with regard to network 114.

The storage devices 160a-b, 166a-b may be, for example, hard drives. However, each of the storage devices 160a-b, 166a-b could be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, a tape library, EPROMs, EEPROMs, RAM, Non-Volatile RAM, and flash memory. Additionally, CD-R, WORM, DVD-R, and/or DVD+R devices could be included in the plurality storage devices. As an example, one or more of the storage systems 110, 112 could be implemented with a model F20 or model 800 Enterprise Storage Server, available from IBM® Corporation. As another example, disk storage could be implemented with an IBM® FAStT 900, and a tape library could be implemented with an IBM® 3494 tape library using IBM® 3590 drives, all of which are available from IBM® Corporation.

Figure 2B:
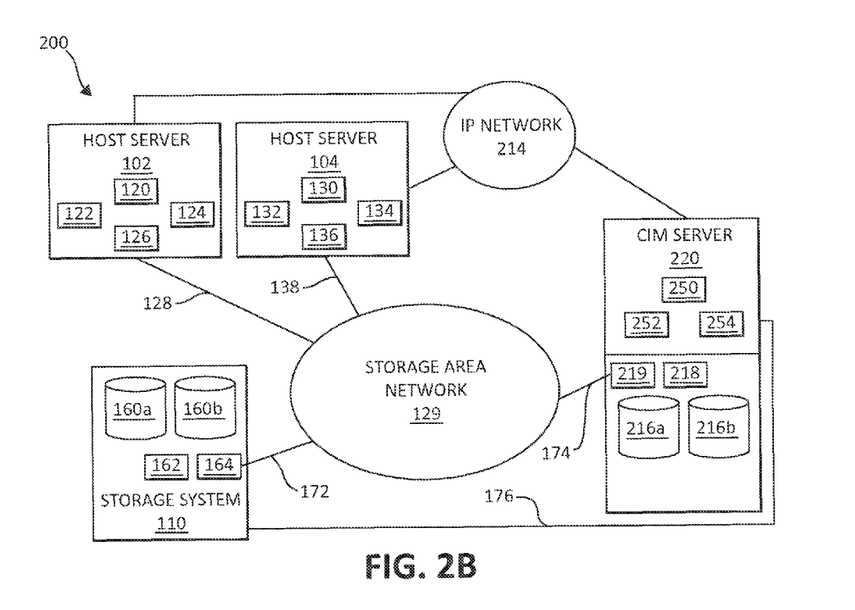
FIG. 2B illustrates an exemplary block diagram of the hardware components and interconnections of a computing system in accordance in which aspects of the present invention may be realized.

FIG. 2B illustrates an exemplary block diagram of the hardware components and interconnections of a computing system in accordance with an example of the invention. An alternative computing system 200 is shown in FIG. 2B. All or portions of the computing system 200 could be used to implement one or more examples of the invention. Computing system 200 includes host servers 102, 104, storage systems 110, 212, SAN 129, and IP network 214. Storage system 212 includes storage devices 216a, 216b, storage controller 218, and hardware bus adapter 219. The storage devices 216a-b may be any of the types of storage devices discussed above with regard to storage devices 160a-b, 166a-b. Storage system 212 further includes embedded CIM server 220. Thus, computing system 200 does not have a proxy CIM server, and the CIM server 220 is embedded in the storage system 212. CIM Server 220 has a processor 250, a memory subsystem that may include a primary memory 252 (for example RAM), and/or a non-volatile memory 254, both of which are coupled to the processor 250. The memory subsystem may be used to store data and application programs and/or other programming instructions executed by the processor 220. The application programs could generally be a CIM Object Manager program, and any other suitable applications. In the computing system 200, hosts 102, 104 and the CIM server 220 in storage system 212 are connected through the IP network 214. IP network 214 may use any suitable type of communications channel technology, for example, Ethernet, ESCON (Enterprise Systems CONnnector), FICON (Fiber CONnector). Additionally, network 214 could use the Internet, and could utilize wireless technology.

Figure 3:
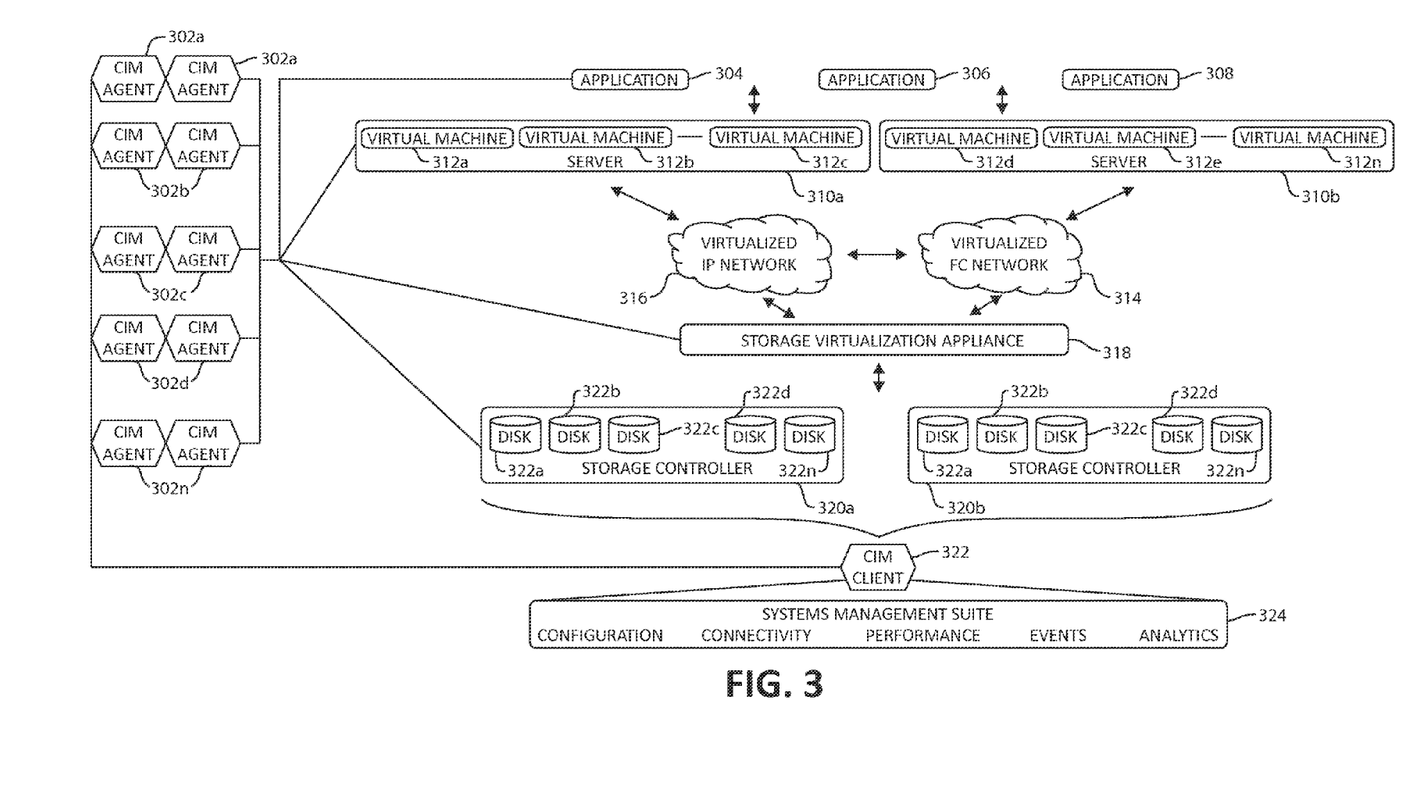
FIG. 3 is an exemplary block diagram for standard management environment with CIM clients and CIM agents interaction.

FIG. 3 is an exemplary block diagram for standard management environment 300 with CIM clients and CIM agent(s) interaction. In one embodiment, by way of example only, the standard management environment 300 includes applications 304, 306, and 308. The applications 304, 306, and 308 are in communication with management server(s) 310a and 310b. Each server(s) 310a and/or 310b may include multiple virtual machines 312 (shown in the figures as 312a-e, and 312n). The servers 310 may be linked and in communication with a storage virtualization appliance 318 via a virtualized IP network 316 and/or a virtualized FC network 314. The storage virtualization appliance 318 is linked and in communication with storage controller(s) 320 (shown in the figures as 320a and 320b). A CIM client 322 is linked and in communication with a systems management suit 324, which includes the performing various functions of configuration, connectivity, performance, events, and analysis. The CIM client 322 is also linked and in communication with each CIM agent 302 (shown in the figure as 302a-d and 302n). Each of the CIM agent(s) 302 work may be associated individually or work in conjunction with multiple CIM agent(s) as a cluster of CIM agents 302. The CIM agent(s), either individually or in conjunction with other CIM agent(s) interface and are in communication with the applications 304, 306, 308, servers 310, virtualized IP network 316, virtualized FC Network 314, storage virtualization appliance 318, and storage controller 320 for the purposes carried out and described in the mechanisms of the illustrated embodiments. Furthermore, each of the CIM agents 302 are connected to one or more CIM client (s) 322 for purposes carried out and described in the mechanisms of the illustrated embodiments.

For example, in a managed environment 300, interactions between CIM Agent(s) 302 and management server(s) 312 follow a very standard set of query-response operations. For example, periodic discovery of managed devices and standard set of control actions are performed by management server 312 on the devices. Thus, the management server 312 and CIM client 322 both may subscribe to a caching mechanism that is guided by a lightweight statistical hint infrastructure to make the query-response system more efficient. The proposed mechanisms of the illustrated embodiments, intelligently combines caching along with deduplication of query and response to reduce network load and processing power consumption. This system may be manually driven by populating CIM agents 302 with canned recipes as well as by automatically learning the recipes exploiting the self-reflective mechanism of underlying CIM. Thus, the redundant data processing is reduced along with network bandwidth and CPU cycles consumption on a managed entity as well as on the server side is reduced. There may be a sizeable cache already at the CIM agent 302 side.

Figure 4:
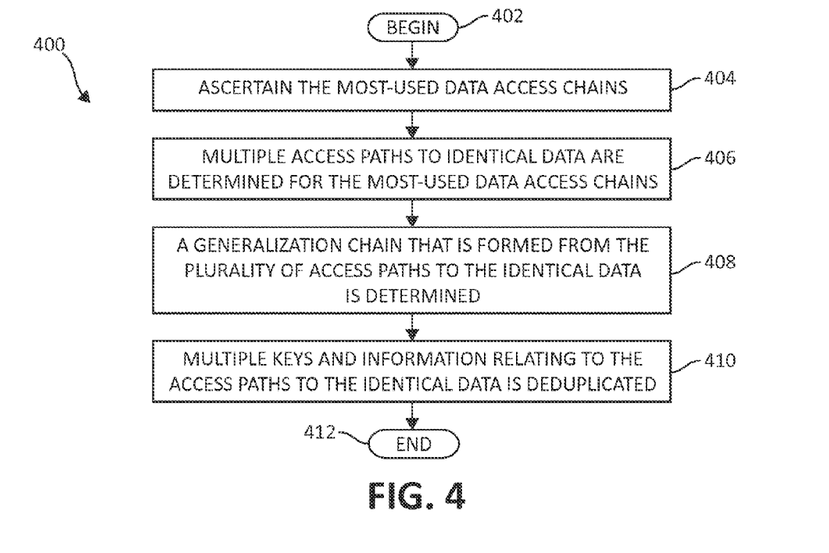
FIG. 4 is a flowchart illustrating an exemplary method for deduplicated caching of queries.

FIG. 4 is a flowchart illustrating an exemplary method 400 for deduplicated caching of queries. The mechanisms of the illustrated embodiments perform deduplication on data (or queries) that may have been cached, thus saving on processing power. Moreover, the mechanisms of the illustrated embodiments will use the deduplicated data while searching through this cache for the enablement of a "Green" data center management. In one embodiment, by way of example only, the method 400 begins (step 402) by ascertaining the most-used data access chains (step 404). Multiple access paths to identical data are determined for the most-used data access chains (step 406). A generalized chain that is formed from the plurality of access paths to the identical data is determined (step 408). Multiple keys and information relating to the access paths to the identical data is deduplicated (step 410). A variety of keys and information relating to the multiple access paths are placed in cache. Thus, allowing the mechanism to prefetch the identical data with the various and/or numerous correct keys. The method ends (412).

In one embodiment, the mechanism performs deduplication on data that has been cached. The deduplication may be performed based on the metadata (contents of the CIM Client request) rather than the data (content of the response received from CIM Agent for the CIM client request). A query-response interaction is used for deduplication on cached data. A multiplicity of the most-used data access chains is ascertained. At least one access paths to the data for the most-used data is determined and a generalized chain is used. Various keys and information relating to the access paths to the data are deduplicated and the keys and the information are placed in a cache. A caching mechanism is guided by a lightweight statistical hint infrastructure that automatically learns at least one recipe pattern. A traversal pattern is built by learning a behavior of a CIM client in a CIM agent. The traversal pattern may be predicted.

Figure 5:
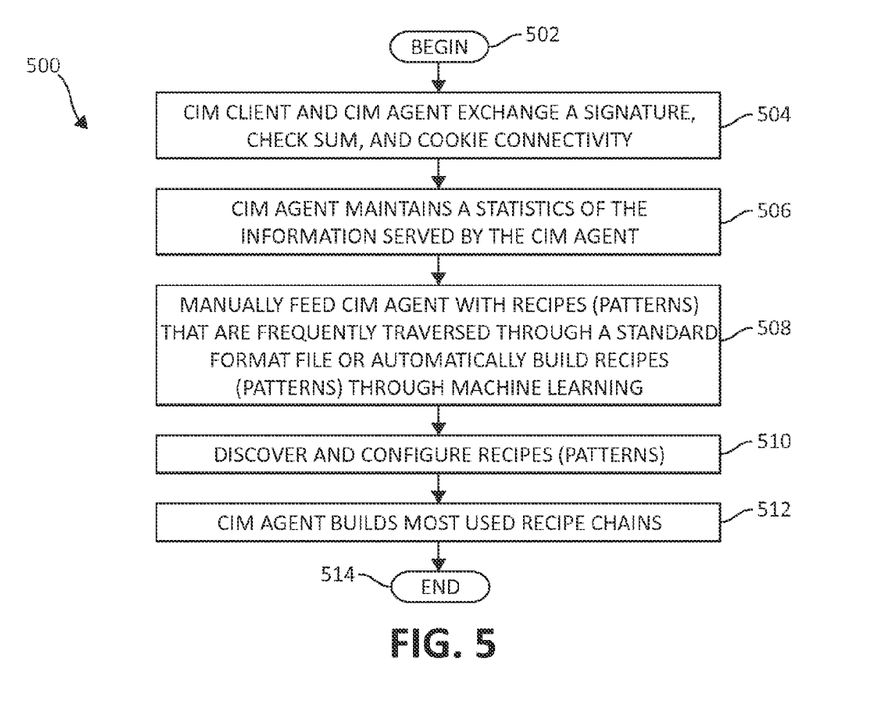
FIG. 5 is a flowchart illustrating an exemplary method with a CIM client and CIM agent for deduplicated caching of queries.

FIG. 5 is a flowchart illustrating an exemplary method 500 with a CIM client and CIM agent for deduplicated caching of queries. In one embodiment, the method 500 begins (step 502) by the CIM client and CIM agent exchanging a signature, a checksum, and a cookie upon connectivity (step 504). The CIM agent maintains statistics of the information served by the CIM agent (step 506). This statistical information may be either pre-populated at startup or populated upon first query or persistently maintained by the CIM Agent. The statistical information/numbers help manage the cache more efficiently. The statistical information/numbers help to form, generate, or provide for statistical hints (or lightweight statistical hints) for space management of the cache since the cache may not be assumed to be of infinite size. This allows a management server and a CIM client both subscribe to a caching mechanism guided by a lightweight statistical hint infrastructure to make the query-response system more efficient.

For example, the statistical numbers maintained may include the number of CIM classes served by the CIM Agent, the number of instances for given CIM Class, an average size of the CIM Instance of a CIM class, the number of association instances, the directionality of association, and/or the cardinality of association etc. In one embodiment, by way of example only, the classes served may be indicated by: IBMTSDS_StorageSystem, IBMTSDS_StoragePool, IBMTSDS_StorageSystem2Pool, IBMTSDS_StorageVolume or other indications. The number of CIM Instances per CIM Class may be illustrated as: IBMTSDS_StorageSystem=1, IBMTSDS_StoragePool=4, IBMTSDS_StorageVolume=100, IBMTSDS_StorageSystem2StoragePool=4, and/or IBMTSDS_StoragePool2StorageVolume=100. The average Size of CIM Instance may be as follows: IBMTSDS_StorageSystem=1.2 KB and/or IBMTSDS_StoragePool=1 KB. The Cardinality and Direction of Association may be: Every IBMTSDS_StorageVolume will have corresponding association in IBMTSDS_StoragePool2StorageVolume, Every IBMTSDS_StoragePool might NOT have corresponding association in IBMTSDS_StoragePool2StorageVolume (e.g. Pool with no volumes), One IBMTSDS_StoragePool may have multiple associated IBMTSDS_StorageVolume (1:n), and/or One IBMTSDS_StorageVolume will NOT be associated with more than one MTSDS_StoragePool. The cacheability of class may be: IBMTSDS_StorageSystem is cacheable and/or IBMTSDS_StorageVolumeStatistics is not cacheable.

The method 500 manually feeds the CIM agent with recipe (or recipe patterns) that is frequently traversed through a standard format file and/or will automatically build the recipe (or recipe patterns) through machine learning (step 508). The method 500 will discover and configure recipe (or recipe patterns) (step 510). The CIM agent builds the most-used recipe chains and/or most used data access chains (step 512). The method 500 then ends (step 514). The recipes may be of the following nature for the discovery recipes. Discovery Recipes: 1) enumerateInstances(IBMTSDS_StorageSystem) pointing to, equal to, and/or associating with associators (IBMTSDS_StorageSystem pointing to, equal to, and/or associating with IBMTSDS_FCPort) 2) enumerateInstances(IBMTSDS_StorageSystem) pointing to and associating with associators (IBMTSDS_StorageSystem pointing to and associating with IBMTSDS_StoragePool) pointing to, equal to, and/or associating with associators (IBMTSDS_StoragePool pointing to, equal to, and/or associating with IBMTSDS_S- torageVolume). The recipes could be of the following nature for the configuration Recipes: 1) enumarateInstances(IBMTSDS_StorageSystem) pointing to, equal to, and/or associating with associators (IBMTSDS_StorageSystem pointing to, equal to, and/or associating with IBMTSDS_StorageConfigurationService) pointing to and associating with invokeMethod(IBMTSDS_StorageConfigurationService).

Figure 6:
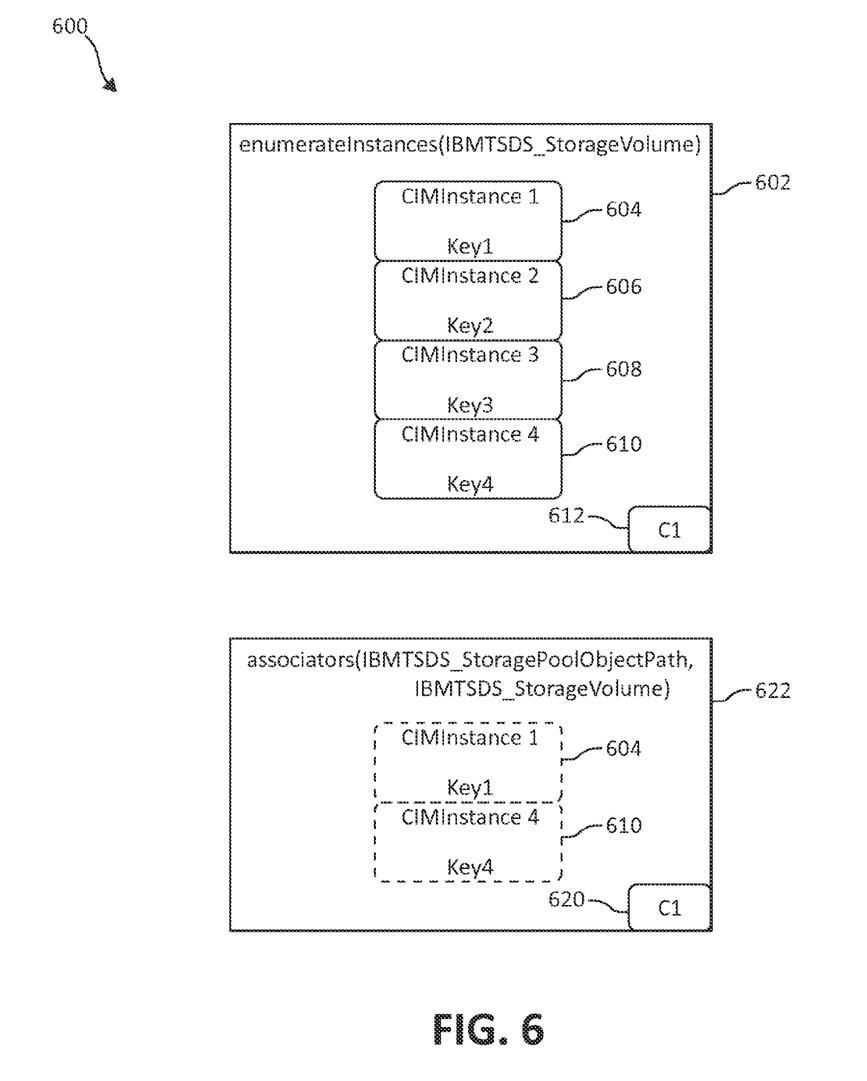
FIG. 6 is an exemplary block diagram for CIM client and CIM agent to deduplicate caching of queries.

FIG. 6 is an exemplary block diagram for CIM client and CIM agent to reduce cache footprint. The mechanisms of the present invention, reduce the redundancy of data processing, network bandwidth and CPU cycles consumption on managed entity as well as server side. Thus, in an effort for increased efficiency and reduction of processing power, the mechanisms of the illustrated embodiments provide an enablement of "Green" data center management. In one embodiment, by way of example only, if enumerate(IBMTSDS_StorageVolume) 602 returns four instances for the client 1, illustrated as CIMInstance 1 604, CIMInstance 2 606, CIMInstance 3 608, and CIMInstance 4 610. Each of the four CIMInstances 604, 606, 608, and 610 are unique with their keys (CIMObjectpath). A hash of each CIMInstance 604, 606, 608, and 610 is created and embed into the CIMInstance 604, 606, 608, and 610. These additional keys are introduced by infrastructure without any modification to the CIM standard. C1 being the client 612. An analogy of this could be drawn to the fact that the HTTP GET URL would have format with parameters such as http://www.foo.com/index.html?bob=123&frank=321&tom=213. In this URL for a specific domain, there are 3 input variables named bob, frank and tom with their values. During the GET method invocation, the HTML page may be sent with additional hidden keys along with the three variables in the form <input type="hidden" name="Hash" value="Key1">. In the mechanisms of the illustrated embodiments, the CIM example, enumerate(IBMTSDS_StorageVolume) 622 would return with four CIM instances 604, 606, 608, and 610 with hidden keys in the instances—e.g. K1, K2, K3 and K4. Assume a subsequent call associate(IBMTSDS_StoragePool->IBM_StorageVolume) 622 returns two of the volumes (CIM Instances 604 and 610) returned in enumerate(IBMTSDS_StorageVolume). In this case, the client C2 620 might get the keys K1 and K2 from server and return the result from client cache.

Since interactions between CIM Agent(s) and management server(s) may follow a very standard set of query-response operations, such as periodic discovery of managed devices, the management server and CIM client both may subscribe to a caching mechanism guided by a lightweight statistical hint infrastructure to make the query-response system more efficient. As previously mentioned, the mechanisms of the illustrated embodiments may combine caching along with deduplication of a query and response to reduce network load and processing power consumption. The deduplication may be performed based on the metadata (contents of the CIM Client request) rather than the data (content of the response received from CIM Agent for the CIM client request). This system may be manually driven by populating CIM agents with canned recipes as well as by automatically learning the recipes exploiting the self-reflective mechanism of underlying CIM.

Figure 7:
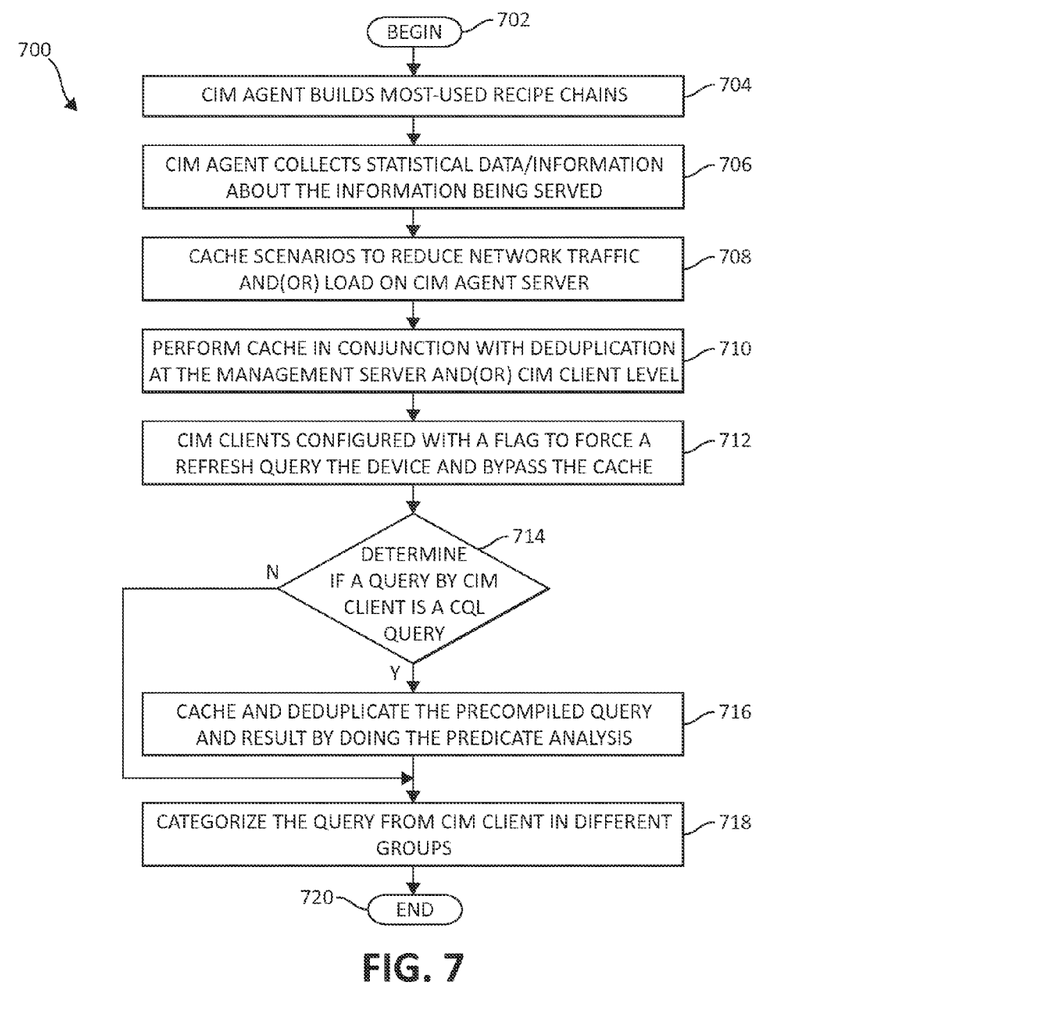
FIG. 7 is a flowchart illustrating an exemplary method 700 with a CIM client and CIM agent for caching of queries in conjunction with deduplication.

FIG. 7 is a flowchart illustrating an exemplary method 700 with a CIM client and CIM agent for caching of queries in conjunction with deduplication. In one embodiment, the method 700 begins (step 702) CIM Agent builds most-used recipe chains (step 704). The building of the most-used recipe chains may be accomplished by either manually feeding the recipes to the CIM agent or the CIM Agent learning the recipes using machine learning. The CIM Agent collects statistical data/information about the information being served (step 706). The scenarios (queries, recipe/recipe patterns, etc.) are cached and deduplicated to reduce network traffic and/or load on CIM Agent server (step 708). The method 700 will then perform a cache in conjunction with deduplication at the management server and/or CIM client level and perform caching in conjunction with deduplication (step 710). In one embodiment, the caching and the deduplication process may occur by a) the CIM Agent receiving a request, b) based on the class and the method of the request it is determined whether information may be found in cache, e.g. the server CPU performance may not be cached but server CPU details may be cached, c) if the CIM client maintains a cache, the CIM client sends the CIM client-signature along with the call details. The deduplication may be performed based on the metadata (contents of a CIM Client request) rather than the data (content of a response received from CIM Agent for the CIM client request). The CIM client also sends the checksum of the information if available in CIM Client cache. If the checksum of the CIM client matches with checksum in CIM Agent cache, the CIM client is just acknowledged with the correct checksum match, e.g. CIM Client makes a first call enumerateInstances(IBMTSDS_StorageSystem) to CIM Agent. The CIM Agent prepares the response data and sends it back to CIM Client but also maintains the checksum say C1 of enumerateInstances(IBMTSDS_StorageSystem) result. The checksum is also returned to CIM Client (the response might or might not be cached in CIM Agent, the checksum might or might not be cached in CIM Agent, the checksum might or might not be cached in CIM Client]. On subsequent enumerateInstances(IBMTSDS_StorageSystem) calls, the CIM Client sends the query along with checksum C1. If it is a match of the CIM Agent, the CIM Agent just returns the response as C1 saving the network data transfer. If enumerateInstances(IBMTSDS_StorageSystem) was called then the present invention may prefetch the associators (IBMTSDS_StorageSystem->IBMTSDS_FCPort), associators (IBMTSDS_StorageSystem->IBMTSDS_StoragePool) and associators (IBMTSDS_StorageSystem->IBMTSDS_StorageConfigurationService), since these are the three potential recipes that could be traversed. As the traversal progresses, the present invention will concretize on the recipe being invoked to make a better prefetch. Since the cache may have a limit, the present invention will limit the prefetching by evaluating and determining what may be cached. This is helped by the statistical data that is offered by CIM Agent (e.g. whether to prefetch one path completely or prefetch some path partially). Since CIM is self-reflective, the present invention will build in-memory tree model from MOF and associate weight as the traversal progresses. The Client and server both deduplicate information to reduce caching footprint as described in FIG. 6.

The method 700 continues with the CIM Clients configured with a flag to force a refresh query the device and bypass the cache (step 712). The method will determine if a query by CIM Client is a CQL query (step 714). In one embodiment, the cache may be a HashMap of query-value or complex complete-result with a deferred predicate analysis (similar to the PreparedStatement caching in databases). In one embodiment, a cache invalidation/re-population is assumed in case of a change in device data through SNMP traps, device traps and self CIM indication etc.) If the query by CIM Client is not a CQL query, the method 700 will categorize the query from CIM Client in different groups (step 718). If the query by CIM Client is a CQL query, the method 700 will cache and deduplicate the precompiled query and result by doing a predicate analysis (step 716). The method 700 will categorize (manually feed or learn using machine learning) the query from CIM Client in different groups (step 718). Based on the group type, e.g., cacheble/non-cacheble and/or static verses dynamic, and based on which query from a particular group is executed, the process of determining if a query by CIM Client is a CQL query may be implemented as shown above. To confirm whether the data is recent, not recent, or even if the data is changed, the process of caching scenarios to reduce network traffic and/or load on CIM Agent server may be implemented. Similarly, parts of query processing may be deduplicated (using checksum as indexes as shown above). Multiple queries being processed at identical times may not be exactly the same, but there may be parts of them, which are common. The mechanisms of the illustrated embodiments allow for multiple queries to be executed just once. The method 700 will end (step 720).

To further illustrate, a simple example may be considered. Assume there are four nodes (nodes may be represented as various computing mechanisms in a computing environment) A, B, C, and D. The user may want to go from A to B, B to C, and C to D. Each of the 5 nodes are connected to each other and may have numerous paths that may be traversed to reach the other respective nodes. The most used access data/recipe chains may be the various paths/instances associated with the other nodes and how they are associated. Thus, if a call is made by a user for a particular instance (any data access/recipe chains that may be executed) from a particular node it may enumerate all the instances of A, such as A1, A2, A3, A4, A5 and up to a possible infinite amount, AN. If the user elects to enumerate B, it will show paths B1, B2, B3, B4, B5 and up to a possible infinite amount, BN. Each of the nodes A, B, C, D, or up to an infinite amount of nodes represented by N, may all have the most used data access/recipe chains, for example A1-A5. In this example, we will consider only five instances from both node A and node B. However, the user may be interested in knowing, from a given pathway of node A, such as A1, how many paths from node B are associated with the paths of A1 on node A, or simply showing the multiple access points to the same data. Thus, all the instances from A1 may be only B3 and B5. The user now has a knowledge that even though node A may have five instances, A1, A2, A3, A4, and A5 and an equal amount of paths from node B, there are only 2 pathways, B2 and B3 to node B from instance A1. Similarly, if the user wants to know how many instances from B3 are to node C, the result may by only 2 instances, C1 and C5. But from instance B4, there may be all five instances to node C, C1, C2, C3, C4, and C5. (Assuming in this example node C also only has 5 instances). Thus, going from A to B and B to C there are a variety of instances to traverse each of the nodes, but the user may want to traverse from node A to node B and node B to node C with a particular instance such as A1 to B2 and then use instance B3 to C5 to traverse A to B, B to C.

Now applying the information previously described, there may be one hundred various ways from each node, for example one path of the one hundred paths may be A to B, B to C, C to D, and D to E (stating for simplicity as A-B-C-D-E). In one embodiment, a particular computing component may traverse only three of the one hundred particular paths from A-B-C-D-E, A-B-C-X-Y, and A-B-P-Q, because the product is executing and processing in a certain or particular way. Thus, as soon as this computing component gains access to node A, the mechanism knows that even though at least one hundred instances exist, only three particular instances may be used for this particular computing component. Now, gaining access to B, there are still at least 3 access paths for the computing component. However, when C is accessed, the mechanisms of the illustrated embodiments know that only 2 instances, A-B-C-D-E and A-B-C-X-Y may be executed and the instance of A-B-P-Q is no longer available and discarded. Thus, there may be multiple recipes/chains that are traversed. Based on the pattern of the traversal progressively, weights may be associated and predict the recipe that is going to be traversed. Statistical information regarding all entities are stored alongside. Once the traversal path is predicted, the mechanisms will prefetch the data by doing the traversal in advance and store the data in memory. Such activity assists in reducing the response time. Statistical hints help manage the cache (e.g. if getting all Pools might require a cache of 10 MB we have a cache of 5 MB then we only cache partial information and keep or flag or completely not cache any information).

Figure 8:
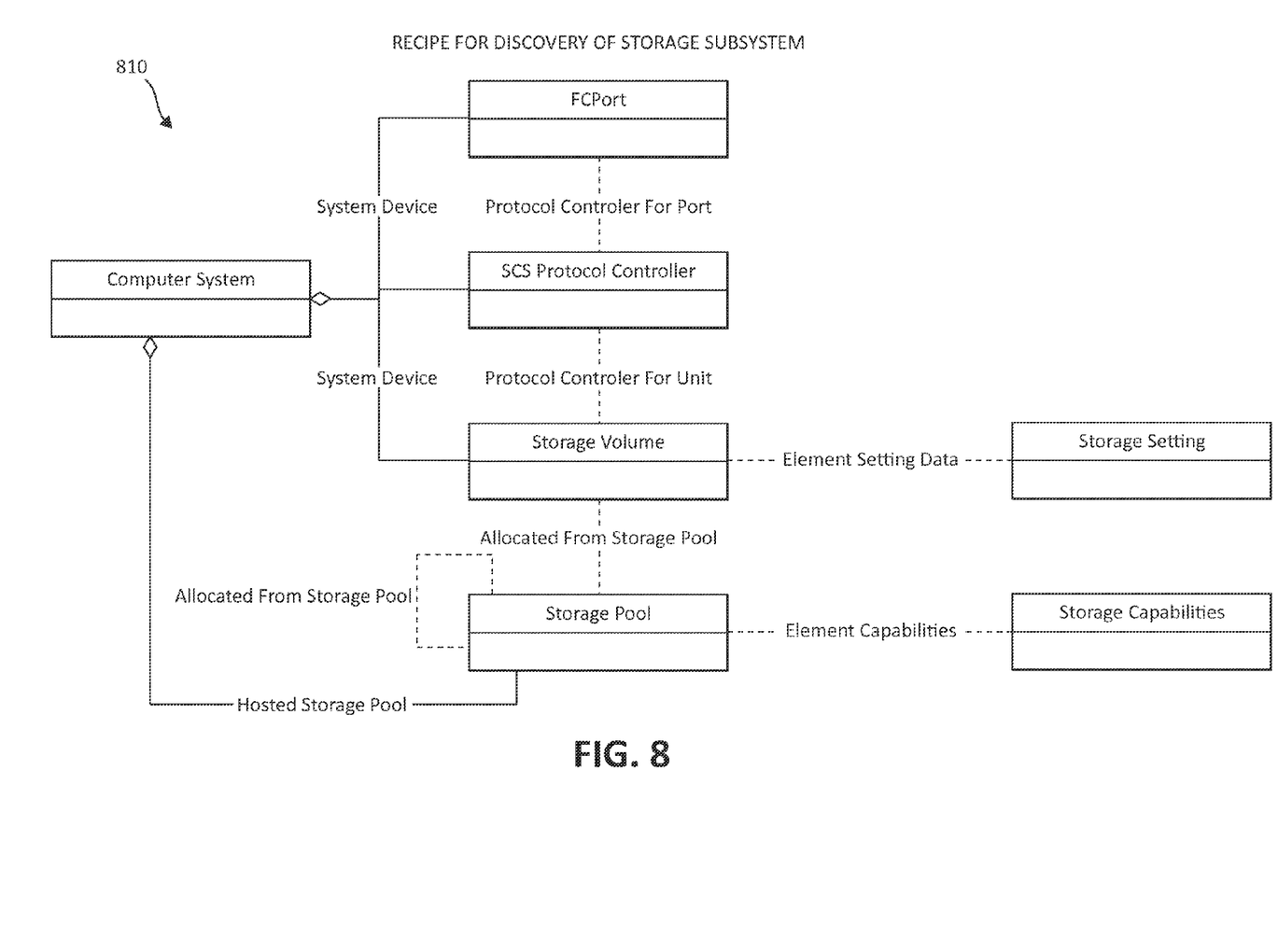
FIG. 8 is an exemplary block diagram of a recipe chain for discovery of a storage subsystem.
Figure 9:
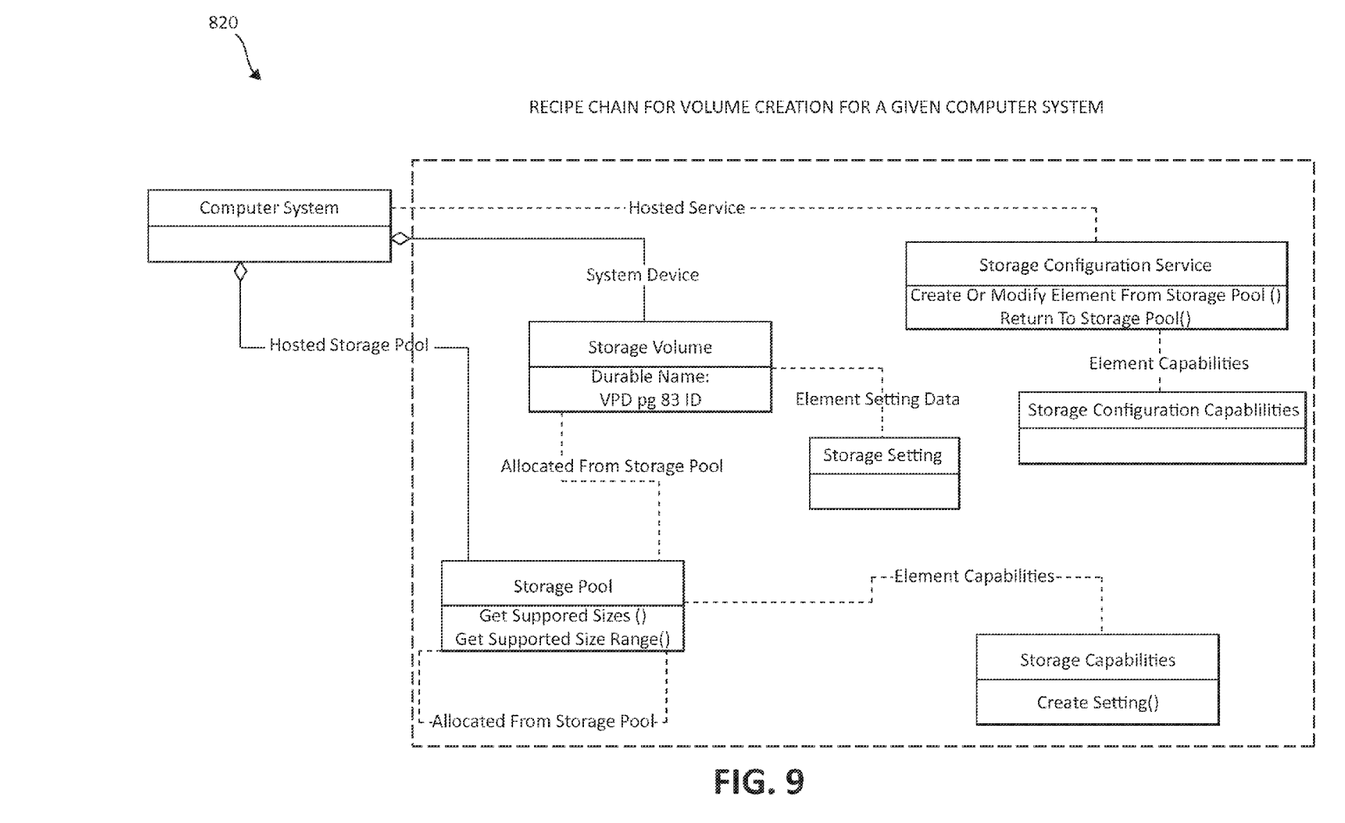
FIG. 9 is an exemplary block diagram of a recipe chain for volume creation for a given computer system.

In one embodiment, the mechanisms of the illustrated embodiments may be shown in FIG. 8 and FIG. 9. FIG. 8 and FIG. 9 are exemplary block diagrams of CIMOM/CIMAgent exposing information through defined profiles regarding a storage subsystem. FIG. 8 is an exemplary block diagram 810 of a recipe for discovery of storage subsystem. For example, considering a situation where a CIMOM/CIMAgent is exposing information regarding a IBM® DS storage subsystem. In the FIG. 8, an example is shown illustrating recipes/data access chains being run by management software in the computing environment. FIG. 8 shows one illustrated embodiment 810 of a recipe/chain for the discovery of Storage Subsystem. The mechanism will enumerate the ComputerSystem. For each ComputerSystem the mechanism will retrieve the associated StoragePools. For each StoragePool, if primordial, the mechanism will retrieve associated StoragePools, or else the mechanism will retrieve the associated StorageVolumes.

FIG. 9 is an exemplary block diagram 820 of a recipe for volume creation for a given computer system "ComputerSystem." The mechanism will retrieve the instances for the ComputerSystem and will retrieve the instances associated with StorageConfigurationService and the instances associated with StoragePools, for each StoragePool, based on condition validity execute method to create storage volume.

It is appreciated that terminology such as "mandatory", "required", "need" and "must" refer to implementation choices made within the context of a particular implementation application described here within for clarity and are not intended to be limiting since in an alternative implantation, the same elements might be defined as not mandatory and not required or might even be eliminated altogether.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for smarter deduplicated caching of queries for green IT management by combining caching and deduplicating of queries and responses to reduce work load by a processor device in a computer storage device, the method comprising:
    ascertaining a plurality of most-used data access chains, wherein a plurality of access paths to identical data is determined for the plurality of most-used data access chains;
    determining a generalized chain that is formed from the plurality of access paths to the identical data; and
    deduplicating a plurality of keys and a plurality of information relating to the plurality of access paths to the identical data, further including performing at least one of: maintaining a plurality of statistics of the plurality of information used by a common information model (CIM) agent, wherein the ascertaining the plurality of most-used data access chains is performed by the CIM agent, and
    using a plurality of statistical hints from the plurality of statistics for managing cache space.

2. The method of claim 1, further including placing the plurality of keys and the plurality of information in a cache.

3. The method of claim 1, further including prefetching the identical data with a plurality of correct keys.

4. The method of claim 1, further including exchanging at least one of a signature and a checksum and a cookie upon connectivity.

5. The method of claim 1, further including manually feeding the plurality of most-used data access chains to a common information model CIM agent.

6. The method of claim 1, further including configuring a common information model (CIM) client with a flag to perform at least one of forcing a refresh of a query and bypassing of a cache.

7. The method of claim 1, wherein the deduplicating is performed on contents of a request from a common information model (CIM) client.

8. A system for smarter deduplicated caching of queries for green IT management by combining caching and deduplicating of queries and responses to reduce work load in a computer storage device, the system comprising:
    at least one processor device operable in the computing storage environment, wherein the at least one processor device is adapted for:

ascertaining a plurality of most-used data access chains, wherein a plurality of access paths to identical data is determined for the plurality of most-used data access chains, determining a generalized chain that is formed from the plurality of access paths to the identical data, and deduplicating a plurality of keys and a plurality of information relating to the plurality of access paths to the identical data, further including a common information model (CIM) agent operable by the at least one processor device, wherein the CIM agent is configured for performing at least one of: maintaining a plurality of statistics of the plurality of information used by the CIM agent, wherein the ascertaining the plurality of most-used data access chains is performed by the CIM agent, and using a plurality of statistical hints from the plurality of statistics for managing cache space.

9. The system of claim 8, wherein the at least one processor device is further adapted for placing the plurality of keys and the plurality of information in a cache.

10. The system of claim 8, wherein the at least one processor device is further adapted for prefetching the identical data with a plurality of correct keys.

11. The system of claim 8, wherein the at least one processor device is further adapted for exchanging at least one of a signature and a checksum and a cookie upon connectivity.

12. The system of claim 8, further including a common information model (CIM) agent operable by the at least one processor device, wherein the CIM agent is adapted to be manually feed the plurality of most-used data access chains.

13. The system of claim 8, further including a common information model (CIM) client operable by the at least one processor device, wherein the CIM client is configured with a flag to perform at least one of forcing a refresh of a query and bypassing of a cache.

14. The system of claim 8, wherein the at least one processor device is further adapted for performing the deduplicating on contents of a request from a common information model (CIM) client.

15. The system of claim 14, wherein the contents include metadata.

16. A computer program product for smarter deduplicated caching of queries for green IT management by combining caching and deduplicating of queries and responses to reduce work load by a processor device in a computer storage device, the computer program product comprising a non-transitory computer-readable storage medium having computer-readable program code portions stored therein, the computer-readable program code portions comprising:

a first executable portion for ascertaining a plurality of most-used data access chains, wherein a plurality of access paths to identical data is determined for the plurality of most-used data access chains;

a second executable portion for determining a generalized chain that is formed from the plurality of access paths to the identical data; and a third executable portion for deduplicating a plurality of keys and a plurality of information relating to the plurality of access paths to the identical data, further including a fourth executable portion for performing at least one of: maintaining a plurality of statistics of the plurality of information used by the CIM agent, wherein the ascertaining the plurality of most-used data access chains is performed by the CIM agent, and using a plurality of statistical hints from the plurality of statistics for managing cache space.

17. The computer program product of claim 16, further including a fourth executable portion for placing the plurality of keys and the plurality of information in a cache.

18. The computer program product of claim 16, further including a fourth executable portion for prefetching the identical data with a plurality of correct keys.

19. The computer program product of claim 16, further including a fourth executable portion for exchanging at least one of a signature and a checksum and a cookie upon connectivity.

20. The computer program product of claim 16, further including a fourth executable portion for manually feeding the plurality of most-used data access chains to a common information model (CIM) agent.

21. The computer program product of claim 16, further including a fourth executable portion for configuring a common information model (CIM) client with a flag to perform at least one of forcing a refresh of a query and bypassing of a cache.

22. The computer program product of claim 16, further including a fourth executable portion for performing the deduplicating on contents of a request from a common information model (CIM) client.

* * * * *